Feb. 21, 1956  R. M. FREY  2,735,826
FURAN RESIN-TALL OIL REACTION PRODUCT
Filed March 4, 1953
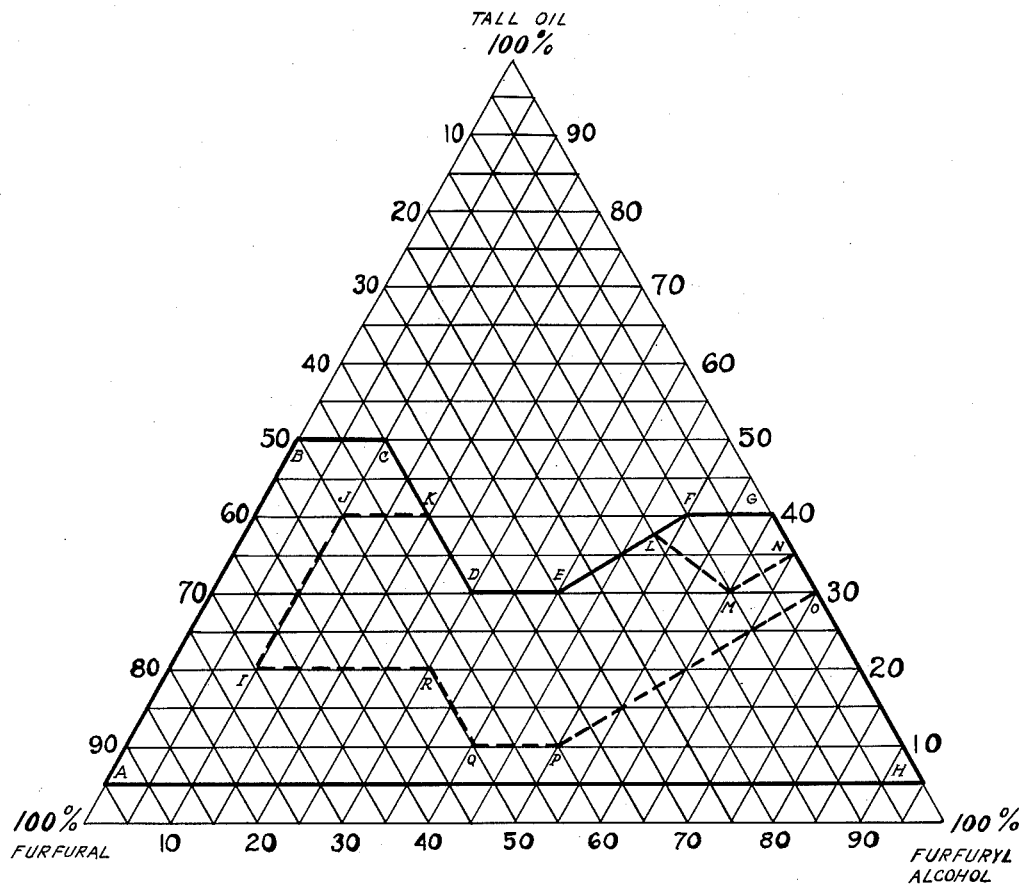
INVENTOR.
Raymond M. Frey
BY Arnold J. Ericsen
Attorney

United States Patent Office

2,735,826
Patented Feb. 21, 1956

2,735,826

FURAN RESIN-TALL OIL REACTION PRODUCT

Raymond M. Frey, Milwaukee, Wis., assignor to McGraw Electric Company, Milwaukee, Wis., a corporation of Delaware Application March 4, 1953, Serial No. 340,281

10 Claims. (Cl. 260—23.5)

This invention relates to insoluble, infusible, synthetic, polymeric and thermosetting resinous compositions, and especially relates to the production of these compositions from materials including furan derivatives and tall oil in either its crude or refined state, or from certain constituents of tall oil.

It is well known that furan resins may be polymerized to provide characteristics of exceptional physical strength and shock resistances, in addition to superior chemical resistance to alkalies, acids and ordinary solvents. These non-reactive reaction products are generally prepared by condensation of furfuryl alcohol with acid and a subsequent neutralization with alkali. This reaction is very difficult to control, both in the laboratory and commercially, inasmuch as it is quite exothermic in nature and must be carefully watched to prevent danger to operators and neighboring equipment. Another disadvantage to the furfuryl alcohol resins is their manufacturing cost.

Recent contributions to the field have brought forth the use of furfural (furfuraldehyde) as a modifying reagent to the reaction, and as a means of reducing the cost by the addition of this less expensive raw material. Workers in this field, however, have found that the addition of furfural preferably should not exceed 15% in order to provide a product of the desired strength and resistant characteristics. The present invention relates to the addition of tall oil, either crude or in various stages of refinement, to the furfuryl alcohol or the furfural-furfuryl alcohol mixture. The resultant product bears substantially the same desired characteristics as the furfuryl alcohol resin, but is very much less expensive to manufacture, and in addition, is easier to control. The composition may be used in its regular resinous state, pressure-molded, or may be filled prior to complete curing with various molding composition fillers, which constitute the subject matter of the copending application filed by Raymond M. Frey on November 25, 1953, bearing Serial No. 394,475, and assigned to the same assignee as the present invention.

The reaction appears to be electrophillic in nature and accordingly is responsive to the well-known Lewis acid catalysts, sulfuric acid, stannous chloride, phosphoric anhydride, ferric chloride, 4-acetyl amino benzene sulfonyl chloride, hydrochloric acid, aniline sulfate, p-toluene sulfonyl chloride, maleic anhydride, benzene sulfonic acid, diethyl sulfate, chloromaleic anhydride, cupric chloride and oxalic acid. It is generally desirable to use a latent catalyst which is relatively non-reactive at room temperature or other relatively low temperatures at which the materials may be worked. This use will also provide a better control factor to avoid dangerous spontaneous reactions with certain of the ingredients. It is known that certain of the Lewis acid catalysts react at various threshold temperature levels making them ideally suited to condensation reactions which are often dependent upon the amount of heat applied wherein reaction control becomes of considerable importance. These acid catalysts have been fully described as to their nature and action of page 80 of the treatise, Advanced Organic Chemistry, 2nd ed., by G. W. Wheland, Wiley & Sons, Inc., New York.

Various components of tall oil have been used successfully, although it will be obvious that when substituted for crude tall oil, the proportions need to be varied accordingly dependent upon pH, degree of saturation, etc. Tall oil, which is a product recovered from the paper industry, is an organic product including a mixture of acids, esters and non-saponifiables varying in composition from time to time depending principally on the details of the method of preparation and refining of the crude tall oil. It is known, however, that both crude and refined tall oil include a major portion of unsaturated fatty acids such as oleic, linoleic and conjugated linoleic acids, in addition to various rosin acids and terpenes.

After it had been determined that tall oil would effectively combine with furfural and/or furfuryl alcohol to produce the invented thermosetting resinous composition, tall oil samples were investigated that had been obtained from paper products companies using pulp ingredients from various sections of the country and from sources manufacturing paper under a variety of processes. These investigations have clearly shown that the source of supply of tall oil did not affect its ability to react. The precise mechanics of reaction are not clear at the present time, but it is known that there is a considerable amount of unsaturated components reacting to provide the resinous material. This is verified from the relatively high Iodine Numbers of tall oil, ranging from 140 to 210. It appears that the entire amount of tall oil combines with the reaction product, inasmuch as there was no indication of the presence of side components after polymerization had taken place, when proper proportions less than an excess were reacted with one another. Undoubtedly, ingredients of tall oil that do not react directly are helpful extenders, which do not materially affect the chemical resistance or mechanical strength of the resinous product.

It is of interest to note that crude tall oil compositions obtained have had the following range of compositions and characteristics:

| | |
|---|---|
| Fatty acids_____percent__ | 40–60 |
| Rosin acids_____do____ | 35–50 |
| Saponification number_____ | 155–185 |
| Acid number_____ | 155–175 |
| Iodine number_____ | 140–210 |
| Unsaponifiable matter_____percent__ | 5–10 |
| Rosin acid number_____ | 60–95 |
| Moisture content_____percent__ | .4–1.5 |

It has been found most desirable from an economy standpoint to use crude tall oil as the modifying ingredient in the basic furfural, furfuryl alcohol reaction, inasmuch as there is no apparent effect on the final produce when compared to the more expensive derivatives of the crude tall oil. Examples of the use of refined tall oil and certain derivatives of tall oil will be described hereinbelow. Various proportions of the three major components were investigated after the initial discovery was made. These are represented on the triaxial diagram comprising the single drawing indicating the relative proportion of furfural, tall oil, and furfuryl alcohol applicable to the practice of the present invention.

In the diagram, the respective sides of the triangle indicate the percentages by weight of furfural, tall oil, and furfuryl alcohol, from 0 to 100%. It is to be noted the use of refined tall oil having a lesser moisture content than the less expensive crude does not noticeably affect the desired proportions; nor does the use of an evacuated closed system materially affect the desired proportions indicated on the diagram.

The compositions that have been found to be operative as thermosetting materials are approximately defined on the accompanying triaxial diagram by the solid lines, wherein the tall oil component is in excess of 5.0%. It is well known that thermosetting compounds have been provided from various proportions of furfural and furfuryl alcohol combined with one another without the presence of tall oil. Investigations have found that there is no noticeable advantage in providing tall oil in the basic mixture in lesser proportions than 5%.

Thermosetting resins having desirable chemical resistance properties may be produced by a selection of components from within the range defined by solid lines AB, BC, CD, DE, EF, FG, GH, HA. Not all of the specimens prepared were desirable from a strength or molding standpoint, but were found to be of a thermosetting nature, curing at a temperature range of 175–180° F., the components having been reacted in the presence of 2% by weight of diethyl sulfate as the catalyst.

The desired physical end molding properties were found in a selection of components from within the range defined by the dotted lines IJ, JK, KD, DE, EL, LM, MN, NO, OP, PQ, QR, RI. The preferred properties generally consist of a homogeneous texture, bubble-free consistency, ability to be filled with fibrous materials, excellent mechanical strength, hardness, a non-chalky consistency, and economy denoted by a relatively larger content of tall oil and furfural than the more costly furfuryl alcohol without noticeable sacrifice to any of the aforementioned desired properties. A preferred selection of components possessing all of the above-mentioned advantages constitutes the subject matter of copending application, Serial No. 340,282, filed on March 4, 1953, by Raymond M. Frey and Joseph L. Matherne, and assigned to the same assignee as the present invention.

*Example 1*

The area on the triaxial diagram bounded by the solid lines AB, BC, CD, DE, EF, FG, GH and HA was determined by selecting a series of varying proportions of tall oil, furfuryl alcohol and furfural and reacting them according to the following general procedure: The selected proportions were each admixed with 2% diethyl sulfate by weight of total mix. The mixture was heated on a water bath from room temperature to a temperature of approximately 180° F. over a period of about 30 minutes, at which point an exothermic reaction took place with a subsequent mixture temperature rise of about 50° F. The heat was removed and the mixture cooled to 180° F. After the mix was brought under control, heat was again applied to hold the mixture temperature at about 180° F. There was no further evidence of an exothermic reaction taking place. This second period of heating was continued until the mixture polymerized to the desired viscosity for casting. A viscosity of 400–500 centipoises measured at 140° F. was found to be desirable for a relatively simple mold configuration.

The material was poured in a mold and cured in an oven at 175–180° F. for a period of approximately 4–5 hours. Certain samples were cast and cured to a thermosetting resin at room temperature, which formed in from two to four days.

It appears that the condensation reaction is very much dependent upon pH values—especially values in the acidic range. This was determined by selecting one proportion and measuring the pH of the reactants, when mixed together, to be a value of 4.3. On the addition of 2% diethyl sulfate, the pH measured 3.8. The pH measured shortly before the exothermic reaction took place was found to be a value of 0.5. This indicates that the catalyst undoubtedly hydrolyzed to provide the proper acidity for catalyzing the electrophillic reaction.

*Example 2*

Certain ingredient proportions were selected from the heretofore mentioned area on the triaxial diagram and were permitted to polymerize at room temperature. The ingredients were mixed with the catalyst and permitted to stand without additional heating. The mixture thickened after the expiration of from 36 to 48 hours, and on reheating exhibited no signs of exothermic reaction. The heating was continued until the desired casting consistency was reached. The material readily cast and cured to a thermosetting resin.

It will be obvious from this example that, when given a sufficient period of time, the mixture including catalyst will react to provide a polymeric product which may be cured to a thermosetting resin.

*Example 3*

Certain ingredient proportions making up the said area on the triaxial diagram were mixed with the catalyst and placed in a closed flask having a direct connection to a vacuum pump through a trap. A vacuum of 28–30 mm. Hg was applied to the flask. The mixed material was heated over a water bath as before. After the exothermic reaction took place, it was noted that the vapors which had condensed in the trap formed two individual layers. One layer was found to be water, which was formed during the condensation reaction, while the remaining layer consisted of unpolymerized material which was returned to the flask. Heating was continued as in the previous examples, with the entire process, including mixing, cooling and reheating until the desired viscosity was obtained, taking from between ¾ to 1 hour. There are certain advantages to conducting the reaction under evacuated conditions, and include the fact that the reaction is easier to control because of a lower temperature rise under exothermic conditions, that water formed during condensation may be distilled over during the reaction, and that losses are kept to a minimum with the use of a closed system.

*Example 4*

Various catalysts were tried with a selected mixture of crude tall oil, furfural and furfuryl alcohol without noticeable effect on the desired properties included within the dotted lines of the triaxial diagram. A selected ingredient proportion was heated in the presence of a catalyst selected from the group consisting of sulfuric acid, stannous chloride, phosphoric anhydride, ferric chloride, 4-acetyl amino benzene sulfonyl chloride, hydrochloric acid, aniline sulfate, p-toluene sulfonyl chloride, maleic anhydride, benzene sulfonic acid, chloromaleic anhydride, cupric chloride, and oxalic acid. Each of these samples included approximately 2% of one of the above listed catalysts. The samples were heated according to the manner set forth in Example 1 and were found to polymerize and cure to a thermosetting resin in substantially the same manner as set forth in the above-mentioned example.

As has previously been mentioned, it has been found most desirable to use crude tall oil as the modifier in the basic furfural, furfuryl alcohol reaction. However, a thermosetting resin of the desired physical and chemical characteristics was successfully obtained by using refined tall oil as an ingredient. The refined material had a considerably lower moisture content than the crude, and included the following composition and characteristics:

| | | |
|---|---|---|
| Fatty acids | Percent | 49 |
| Rosin acids | do | 43.5 |
| Unsaponifiable matter | | 1 7 |
| Moisture content | do | .1 |
| Acid number | | 160 |
| Iodine number | | 160 |

[1] Approximately.

Example 5

15.0 grams of refined tall oil, 30.0 grams of furfuryl alcohol, and 10.0 grams of furfural were mixed together in the presence of 1.2 grams of maleic anhydride and 1.2 grams of p-toluene sulfonyl chloride. The material was mixed at room temperature, then heated by means of a water bath to 170° F. After the exothermic reaction took place the mixture was cooled to 160-165° F. and heated for ½ hour, at which time the mixture polymerized to a viscous state. The polymerized material was cast and placed in an oven at 170-180° F. until the sample was cured. The catalyst herein used comprised a mixture of maleic anydride and p-toluene sulfonyl chloride to provide the control benefit of a stepwise reaction, wherein the maleic anhydride started the reaction at a lower threshold temperature than the chloride. Both components are practically non-reactive at room temperature.

Components of tall oil are readily available on the market, and include the further refined product essentially comprising the neo-fats including the following chemical composition:

| | Percent |
|---|---|
| Oleic acid | 46.0 |
| Linoleic acid | 39.0 |
| Linolenic acid | 3.0 |
| Rosin acids | 12.0 |

Example 6

The neo-fat was combined with furfural and furfuryl alcohol, along with an acidic catalyst in the following proportions:

| | Grams |
|---|---|
| Neo-fat material | 40 |
| Furfural | 40 |
| Furfuryl alcohol | 120 |
| Maleic anhydride | 2.4 |
| p-toluene sulfonyl chloride | 2.4 |

The ingredients were admixed at room temperature and placed in a hot water bath over an electric hot plate. The mixture was heated with continuous stirring on this bath until it reached a temperature of approximately 180° F. after approximately 50 minutes. The water temperature at this point was 177° F. An exothermic reaction took place at the expiration of this period with a consequent rise in temperature of about 50° F. Removal of the mixture from the bath for 15 minutes indicated a drop in temperature to 175° F. Resumption of heating took place on the water bath at a mixture temperature of 180° F. for approximately 1 hour and 40 minutes without indication during this period of further exothermic reaction. At the expiration of this period the material was of a desired consistency for pouring into casting molds. The cast material was then placed in an oven at 175° F., until the samples are fully cured. It has been found to be a little easier to move the material from the molds after curing than if removed after a short curing period at room temperature before placed in the oven. However, from an operating standpoint, both procedures are satisfactory.

Thermosetting resins were also obtained by the use of crude tall oil and furfural alone in addition to crude tall oil and furfuryl alcohol alone. These are indicated by the following examples:

Example 7

10 grams of furfural and 10 grams of tall oil were mixed together in the presence of 2% diethyl sulfate at room temperature. The mixture was heated over a water bath at 180° F. until the exothermic reaction took place, which resulted in a temperature rise of the mixture to about 230° F. The mixture was cooled and reheated after it reached 180° F., with the heat being continued until the material polymerized. The material was then cured at a temperature of between 175 and 180° F. to a hard, infusible thermosetting resin.

Example 8

30 grams of furfuryl alcohol and 15 grams of tall oil were mixed together in the presence of 2% diethyl sulfate and reacted according to the same procedure as described in Example 7. The resulting product polymerized and was cured at 175 to 180° F. to a thermosetting resin.

Once that it had been established that tall oil or constituents of tall oil reacted favorably with furan compounds, further investigation was directed to various other derivatives of furan. These are exemplified by the following examples:

Example 9

20.0 grams of crude tall oil and 0.6 gram of diethyl sulfate were mixed with 10.0 grams of tetrahydrofurfuryl alcohol.

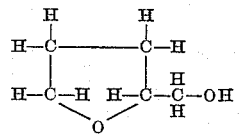

An extremely viscous material was obtained on heating.

Example 10

A thermosetting compound was formed by mixing 15.0 grams of furfuryl alcohol, 10.0 grams of crude tall oil, 5.0 grams of furfural and 5.0 grams of tetrahydrofurfuryl alcohol in the presence of 1.75 grams of diethyl sulfate (5%) at room temperature. The resin samples obtained by reheating and curing after the exothermic reaction took place were very hard, uniform and shiny.

Example 11

20.0 grams of crude tall oil, 20.0 grams of furfuryl alcohol and 10.0 grams of tetrahydrofurfuryl alcohol were mixed at room temperature with 2.5 grams of diethyl sulfate. After heating the sample until it polymerized to a desired pouring viscosity, it was cured to provide a thermosetting resin which was uniform and shiny throughout, but a trifle more brittle than the sample of Example 10. The initial heating took place as before at a temperature of approximately 180° F. with a subsequent rise in temperature of approximately 50° F. as the reaction became exothermic.

Example 12

20.0 grams of crude tall oil, 20.0 grams of furfural and 10.0 grams of tetrahydrofurfuryl alcohol were mixed at room temperature with 2.5 grams of diethyl sulfate (5%). The thermosetting resinous samples obtained after polymerizing and curing were very shiny and smooth throughout, but brittle in texture.

Example 13

5.0 grams of crude tall oil and 0.3 gram of diethyl sulfate were mixed with 10.0 grams of furfuryl acetate.

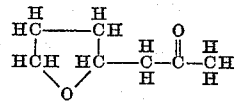

The mixture polymerized to a viscous material on heating.

Example 14

The addition of 5.0 grams of furfural to the components of Example 13, which consisted of the following proportions: 15.0 grams of furfuryl alcohol, 10.0 grams of crude tall oil and 5.0 grams of furfuryl acetate mixed in the presence of 1.75 grams of diethyl sulfate (5%), provided a thermosetting compound on heating and curing at a temperature about 180° F. The resultant samples were uniform, smooth, but brittle.

Example 15

20.0 grams of crude tall oil, 20.0 grams of furfuryl alcohol, and 10.0 grams of furfuryl acetate were mixed at room temperature with 2.5 grams of diethyl sulfate (5%) and heated at 180° F. until the exothermic reaction raised the temperature approximately 50 degrees. The mixture was cooled and reheated at 180° F. until it polymerized to the desired viscosity, at which time it was cured at approximately 180° F. to provide a thermosetting resin which was chalky, dull and brittle.

Example 16

5 grams of crude tall oil, 3.0 grams of furfural and 0.9 gram of sulfuric acid were mixed with 10.0 grams of tetrahydrofuran.

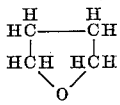

This was mixed at room temperature and polymerized without additional heating.

Example 17

15.0 grams of furfuryl alcohol, 10.0 grams of crude tall oil, 5.0 grams of furfural, and 5.0 grams of tetrahydrofuran were mixed in the presence of 1.75 grams of diethyl sulfate (5%) at room temperature. The mixture was heated over a water bath at a temperature of approximately 180° F. until an exothermic reaction took place. The reaction was then cooled down to approximately 180° F. and reheated without indication of further exothermic reaction. This material polymerized, and was cured to provide a sample that was smooth and shiny, but brittle.

Example 18

20.0 grams of crude tall oil, 20.0 grams of furfuryl alcohol, and 10.0 grams of tetrahydrofuran were mixed in the presence of 2.5 grams of diethyl sulfate according to the procedure of Example 17. The material polymerized and cured to a porous and chalky texture.

Example 19

20.0 grams of crude tall oil, 20.0 grams of furfural and 10.0 grams of tetrahydrofuran were mixed together at room temperature in the presence of 2.5 grams of sulfuric acid. The resultant thermosetting material reacted without heat and the sample was shiny and smooth and fairly strong.

Example 20

10.0 grams of crude tall oil and .6 gram of sulfuric acid were mixed with 10.0 grams of furoamide.

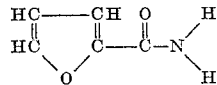

On heating, and subsequently cooling, a very viscous material was formed on polymerization. When heated again and several drops of furfural were added, a thermosetting compound was formed.

Example 21

10.0 grams of crude tall oil, 8.0 grams of furoamide, 1.0 gram of furfuryl alcohol and 1.0 gram of furfural were mixed with 0.4 gram of diethyl sulfate (2%) at room temperature. This material was heated and cured to provide a thermosetting compound.

Example 22

10.0 grams of crude tall oil and 0.3 gram of sulfuric acid (2%) were mixed at room temperature with 5.0 grams of furoyl chloride.

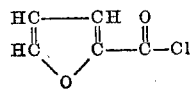

This mixture became very viscous on heating at approximately 180° F., with a subsequent cooling. When heated again, and several drops of furfural were added, the mixture became thermosetting.

Example 23

A thermosetting resinous compound was provided by the reaction of 10.0 grams of crude tall oil, 8.0 grams of furoyl chloride, 1.0 gram of furfuryl alcohol, 1.0 gram of furfural and 0.4 gram of sulfuric acid (2%). The mixture was heated as before, and reheated after cooling from the exothermic temperature, prior to curing at approximately 180° F.

It is to be noted that in all the above listed examples, the only side compound formed that did not subsequently combine with the final product was water which is a natural product of the condensation reaction. Though it is not entirely clear that all the ingredients chemically reacted with one another to provide the thermosetting compounds, it is at least apparent that the ingredients combined to act as helpful extenders and modifiers that had little or no effect on the final desired characteristics.

Extensive consideration was given to the chemical resistance properties of the furan resin comprising the basic components of furfuryl alcohol, crude tall oil and furfural. Water absorption was found to be excellent after 72 hours with only a 0.2% gain in weight. The sample was only slightly discolored in methyl alcohol after 16 days. The material is practically insoluble in acetone, isopropyl alcohol, 25% sulfuric acid, sodium hydroxide, benzene, toluene, petroleum ether, kerosene, and xylene.

It will be apparent that an improved furan resin composition has been provided, which material may be cast directly or which may be filled with various materials are molded, in addition to being characterized by its superior resistance to most chemical solvents, caustics and acids, and exceptional physical strength and shock resistance.

I claim:

1. A composition comprising a polymerized material obtained by effecting reaction between a mixture of tall oil, furfural, and furfuryl alcohol, which are present in relative percentages by weight lying within the area defined approximately in the accompanying diagram by the solid lines AB, BC, CD, DE, EF, FG, GH, and HA.

2. The thermosetting composition obtained on a subsequent curing of the composition of claim 1.

3. A composition comprising a polymerized material obtained by effecting reaction between ingredients including a mixture of tall oil, furfural, and furfuryl alcohol, which are present in relative percentages by weight lying within the area defined approximately in the accompanying diagram by the dotted lines IJ, JK, KD, DE, EL, LM, MN, NO, OP, PQ, QR, and RI.

4. The thermosetting composition obtained on a subsequent curing of the composition of claim 3.

5. The method of producing a polymeric furan derivative between a mixture of tall oil, furfural, and furfuryl alcohol, which are present in relative percentages by weight lying within the area defined approximately in the accompanying diagram by the solid lines AB, BC, CD, DE, EF, FG, GH, and HA which comprises reacting the ingredients in the presence of a Lewis acid catalyst.

6. The method of producing a polymeric furan derivative between a mixture of tall oil, furfural and furfuryl alcohol, which are present in relative percentages by weight lying within the area defined approximately in the accompanying diagram by the dotted lines IJ, JK, KD, DE, EL, LM, MN, NO, OP, PQ, QR, and RI, which comprises reacting the ingredients in the presence of a Lewis acid catalyst.

7. The method of producing a thermosetting resin comprising the steps of reacting by condensation in the presence of a Lewis acid catalyst, mixture of tall oil, furfural, and furfuryl alcohol, which are present in relative percentages by weight lying within the area defined approximately in the accompanying diagram by the solid lines AB, BC, CD, DE, EF, FG, GH, and HA, continuing said reaction until it becomes exothermic, polymerizing by heating on subsidence of said exothermic reaction, continuing said heating until the polymerized product obtains a predetermined viscosity, and finally curing the product to provide a thermosetting material.

8. The method of producing a thermosetting resin comprising the steps of reacting by condensation in the presence of a Lewis acid catalyst, a mixture of tall oil, furfural, and furfuryl alcohol, which are present in relative percentages by weight lying within the area defined approximately in the accompanying diagram by the dotted lines IJ, JK, KD, DE, EL, LM, MN, NO, OP, PQ, QR, and RI, continuing said reaction until it becomes exothermic, polymerizing by heating on subsidence of said exothermic reaction, continuing said heating until the polymerized product obtains a predetermined viscosity, and finally curing the product to provide a thermosetting material.

9. The method of producing a polymeric furan derivative from a furan compound selected from the group consisting of furfural, furfuryl alcohol, tetrahydrofurfuryl alcohol, furfuryl acetate, tetrahydrofuran, furoamide, a furoyl halide, and mixtures thereof, which comprises mixing said compound or mixture with an ingredient containing an unsaturated free fatty acid, and polymerizing the reactants in the presence of a Lewis acid catalyst, the said ingredient containing an unsaturated fatty acid being tall oil.

10. The method of producing a thermosetting resin comprising the steps of reacting by condensation in the presence of a Lewis acid catalyst an ingredient containing an unsaturated free fatty acid material and a furan compound selected from the group consisting of furfural, furfuryl alcohol, tetrahydrofurfuryl alcohol, furfuryl acetate, tetrahydrofuran, furoamide, a furoyl halide, and mixtures thereof, continuing said reaction until it becomes exothermic, polymerizing by heating on subsidence of said exothermic reaction, continuing said heating until the polymerized product attains a predetermined viscosity, and finally curing the product to provide a thermosetting material, the said ingredient containing an unsaturated free fatty acid being tall oil.

References Cited in the file of this patent

UNITED STATES PATENTS

| | | |
|---|---|---|
| 2,058,597 | Koenig | Oct. 27, 1936 |
| 2,077,485 | Lawson | Apr. 20, 1937 |
| 2,383,790 | Harvey | Aug. 28, 1945 |
| 2,443,269 | Ralston | June 15, 1948 |

OTHER REFERENCES

Harber: Ind. and Eng. Chem., vol. 37, pages 953–956, October 1945.